June 5, 1956 S. W. LEWINTER 2,749,390

RINGING CIRCUIT FOR TELEPHONE LINE AND RADIO ORDER WIRE

Filed Dec. 2, 1952 2 Sheets-Sheet 1

INVENTOR
SIDNEY W. LEWINTER
BY Percy P. Lantzy
ATTORNEY

RINGING CIRCUIT FOR TELEPHONE LINE AND RADIO ORDER WIRE

Filed Dec. 2, 1952 2 Sheets-Sheet 2

INVENTOR
SIDNEY W. LEWINTER
BY [signature]
ATTORNEY

United States Patent Office 2,749,390

Patented June 5, 1956

2,749,390

RINGING CIRCUIT FOR TELEPHONE LINE AND RADIO ORDER WIRE

Sidney W. Lewinter, Verona, N. J., assignor to International Telephone and Telegraph Corporation, a corporation of Maryland Application December 2, 1952, Serial No. 323,558

10 Claims. (Cl. 179—84)

This invention relates to communication systems and more particularly to circuits responsive to ringing current on a telephone line or radio order wire in carrier telephone or radio systems.

Some prior art ringing circuits have a pass band which responds only to a limited range of voice frequencies, within band of 300 C. P. S. to 3000 C. P. S. Ringing in these circuits may be accomplished by transmitting a sinusoidal signal of a predetermined frequency which is within this limited passband. With such a simple non-coded system, it is always possible that a particular combination of spoken information may contain a sufficient amount of energy within the acceptance band of the ringing circuit to cause a false ringing alarm. In simple ringing circuits of this type, it is not possible to have a completely foolproof circuit. In some cases this problem may be solved by desensitizing the ringing circuit and transmitting the ringing frequency at a much higher level than normal speech. However, this solution may not be acceptable due to causing an overload on radio or carrier telephone systems. In these circuits protection against false ringing must be obtained by narrowing to minimum the pass band of a filter incorporated in such a circuit and tuned to the frequency of the ringing oscillator. Thus, a practical limit on performance of these circuits is set by their filter and ringing stability, unless usual care is taken in the design of these compounds.

While the above mentioned solution may be acceptable in certain simple telephone systems, it is not permissible in carrier telephone or radio systems where crosstalk must be minimized. In systems wherein the ringing signal must be transmitted at or below speech level, a criterion of ringing performance is the ratio of maximum speech signal for which no false ringing alarm is produced to minimum ringing signal which produces such an alarm.

In another prior art ringing circuit the input signals are applied to a special transformer with two secondary windings which are parts of two filters, one of which is tuned to a frequency at which voice energy is most strongly concentrated, generally 1000 C. P. S. Its output is connected to a diode, which is arranged to deliver a positive signal. The second filter is tuned to the frequency of the ringing oscillator and its output is connected to another diode arranged to deliver a negative signal. The outputs of both diodes are coupled to provide a combined output characterized by a voltage-frequency curve, the positive and negative peaks of which correspond to narrow pass bands for voice and ringing frequencies substantially as illustrated by the curve A of Fig. 2.

With normal speech the combined output of the diodes is generally in the positive direction and no ringing is produced. When ringing signal appears, a relay is released and a ringing alarm is signaled. Occasional bursts of speech may produce in such a circuit a negative output of sufficient magnitude and duration to cause a false alarm. For this reason the prior art circuit includes two pairs of crystal diodes to reduce this possibility. In spite of this precaution there is also a danger of interruption of a coded ringing signal.

An object of this invention is a novel simplified ringing circuit protected against false ringing by speech signals.

Another object of the invention is to provide ringing circuits with means for protection against interruption of coded ringing by the simultaneous occurrence of speech signals.

A feature of this invention is a ringing circuit arrangement essentially comprising two simplified filter circuits, one of relatively wide bandwidth and the other of relatively narrow bandwidth, coupled through an electron discharge device to input speech and a source of ringing signals. One of these filters is responsive to speech signals and the other to ringing signals. A pair of unidirectional devices is provided wherein each is associated with one of the filters to develop a desired polarity voltage at the output of the unidirectional devices dependent upon the signal coupled thereto, a ringing indicator and a control adapted to remain in a non-ringing condition during occurrence of speech signals or absence of signals and to respond to a given polarity voltage to change to a ringing condition for operation of a ringing indicator.

Another feature of the invention is a means associated with the above mentioned control to remove from such control during ringing the application of any voltage that would normally be produced by occurrence of speech signals.

The above-mentioned and other features and objects of this invention will become more apparent by reference to the following description taken in conjunction with the accompanying drawings, in which.

Figure 1:
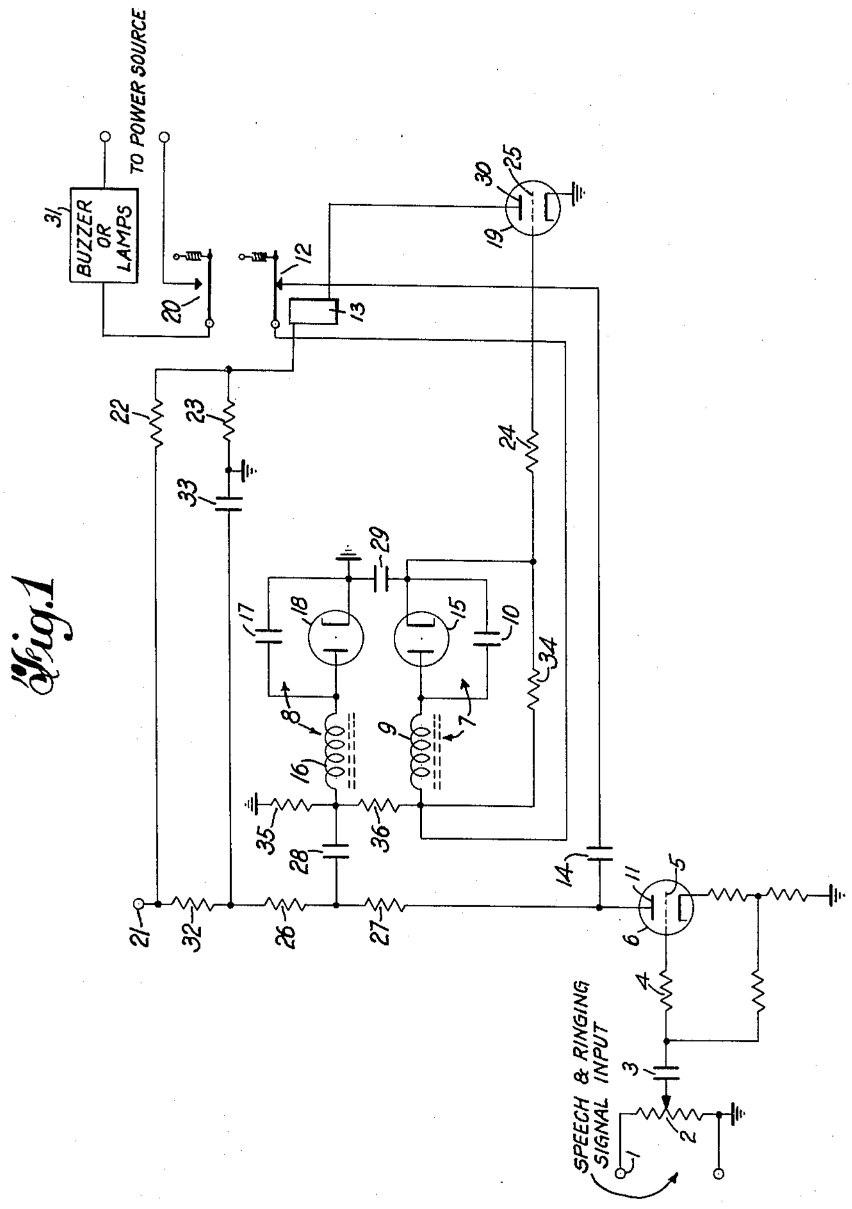
Fig. 1 is a schematic diagram of a ringing current circuit according to the invention.

Referring to Fig. 1, incoming input ringing and speech energies over terminal 1 are impressed through a signal level control device 2, a coupling capacitor 3 and a parasite oscillation suppressor resistor 4 to the control grid 5 of a normally conducting electron discharge device 6, shown as a triode. Output of device 6 is applied to a pair of series filter circuits 7 and 8. Filter 7 comprising an inductor 9 and capacitor 10 is responsive to frequency of input speech energy and is connected to the anode 11 of triode 6 through a "make" contact 12 of relay device 13 and a coupling capacitor 14. This filter circuit 7 is associated with a unidirectional device 15 connected in parallel with the capacitor 10 to deliver a signal of a positive polarity.

The filter 8 comprising an inductor 16 and a capacitor 17 is responsive to frequency of ringing energy, and is associated with another unidirectional device 18 connected in parallel with the capacitor 17 to deliver a signal of negative polarity. The relay device 13 has a function to actuate a ringing indicator when input ringing energy is applied to the circuit. Another function of the relay 13 is to cut-off during ringing the speech branch in the plate circuit of the triode 6, thus insuring against interruption of code ringing by speech energy. The relay 13 is controlled by another electron discharge device, also shown as a triode 19, which holds this relay energized as long as there is no ringing energy applied.

The ringing circuit will be explained now with reference to Figs. 1 and 2. The circuit schematic of Fig. 1 is shown in a non-ringing position.

The incoming ringing and speech energies over terminal 1 are impressed through the signal level control device 2 comprising a potentiometer, the coupling capacitor 3 and resistor 4 to the control grid 5 of normally conducting discharge device 6. As long as no ringing energy is applied to the control grid 5 of triode 6, the relay device 13 having one "make" contact 12 and one "break" contact 20 is normally energized and assumes the contact position shown, the relay being energized from source 21 through a voltage divider comprising resistors 22 and 23, its winding and the normally conducting electron discharge device 19. In this energized position, contact 12 is closed and contact 20 is held open.

When an incoming speech energy is impressed on the control grid 5 of triode 6, the speech branch of the circuit is established from the anode 11, through the coupling capacitor 14, the contact 12 of the relay device 13, the series filter 7, tuned to approximately 1000 C. P. S., and the unidirectional device 15. The device 15 delivers a positive signal which is applied through a grid limiting resistor 24 to the control grid 25 of discharge device 19 insuring its conduction and the energized position of the relay 13.

Thus, at speech frequences which are relatively low compared to the frequency of ringing energy, the effect of the filter circuit 7 is negligible and the unidirectional device 15 essentially measures the voltage developed across the plate load resistors 26 and 27 of device 6 at frequencies lower than the cut-off frequency of filter 7. The resistor 26 is of relatively low value, in the order of 100 to 300 ohms while resistor 27 is of relatively high value, in the order of 10,000 ohms or more. Hence, the rectified voltage across device 15 has a low pass band characteristic. Since the driving source for this speech branch of the circuit is of high impedance, a broad resonance is obtained as shown at B in Fig. 2. The function of the filter circuit 7 is to produce an accentuated response at 1000 C. P. S. with sharp cut-off at about 1200 C. P. S.

When an incoming ringing signal appears at the control grid 5 of electron device 6, the signal will be applied through resistor 27 and a capacitor 28 to the series filter 8 tuned to the frequency of ringing oscillator, say 1600 C. P. S. The resultant selectivity curve is measured by device 18 delivering a negative signal. This negative signal appears through a by-pass capacitor 29 through a grid limiting resistor 24 on the control grid 25 of device 19, having its plate 30 connected to the winding of relay 13. The plate current of the tube 19 is cut-off by the negative voltage on the control grid 25, thus de-energizing the relay 13. When relay 13 is thus de-energized, it opens its contact 12 disabling the speech branch of the circuit, and closes the contact 20 completing the circuit for activation of device 31 which may be a buzzer, lamp or other means for signaling a ringing alarm.

It is to be noted that both components of the series filter circuit 8, namely inductor 16 and capacitor 17 have a high Q factor and they are driven from a low impedance source essentially resistor 26. The outputs of the two differentially connected unidirectional devices 15 and 18 are shown in the combined voltage-frequency characteristic, curve B, Fig. 2.

While the tube 19 is normally conducting in order to maintain the relay 13 energized during absence of signals, the operation may be reversed if desired. In Fig. 3 the circuitry is so arranged that tube 19 in the absence of signals is biased to cut-off thereby normally de-energizing the relay 13. The contacts of the relay, however, are so arranged that during de-energization of the relay, the contact 12 is closed and the contact 20 is opened. The diodes 15*a* and 18*a* are shown reversed to that of diodes 15 and 18 in Fig. 1 so that voice signals produce a negative voltage as indicated by curve C, Fig. 2, which supplements the cut-off bias 37 of tube 19 to insure cut-off during the occurrence of speech signals. The ringing signals, however, result in a positive voltage which overcomes the cut-off bias voltage on tube 19 to cause it to conduct and thereby energize relay 13 which in turn closes contacts 20 to operate a ringing indicator and to open contacts 12 to remove from the circuit any speech signals that may occur during the occurrence of ringing signals.

Figure 2:
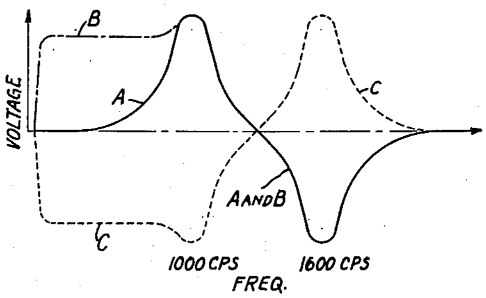
Fig. 2 shows graph illustrating voltage-frequency characteristics useful in the description of Figs. 1 and 3.
Figure 3:
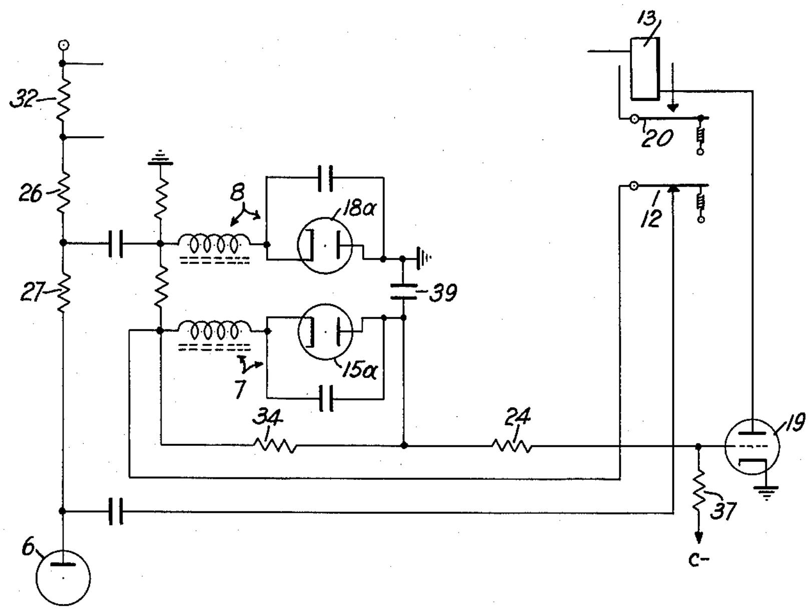
Fig. 3 is a schematic of a modification of this invention.

The improved performance of this ringing circuit, due to much greater discrimination between speech and ringing signals than in the prior art circuit, is demonstrated by comparison of voltage-frequency characteristics of both circuits as shown by curves B and C in Fig. 2. Thus, the fluctuation of the combined output of both unidirectional devices during speech, is always in a given direction, positive in Fig. 1 and negative in Fig. 3, and the elimination of false ringing is achieved without use of additional guard features incorporated in the prior art circuit as protection against false ringing in case of occasional bursts of speech.

My ringing circuit is particularly characterized by transmission of speech signals with peak amplitudes as great as 40 db in excess of minimum ringing frequency required for operation, without giving any false ringing alarm.

While I have disclosed above the principles of my invention in connection with specific apparatus, it is to be clearly understood that this description is made by way of example only and not as a limitation to the scope of my invention as set forth in the objects thereof and in the accompanying claims.

I claim:

1. A ringing circuit to which both speech and ringing signals are applied comprising control means having non-concurrent ringing and non-ringing conditions, frequency sensitive means responsive to speech signals to develop a first voltage, means coupling said first voltage to said control means to maintain said control means in said non-ringing condition during occurrence of speech signals, and frequency sensitive means responsive to ringing signals to develop a second voltage, means coupling said second voltage to said control means to change said control means from said non-ringing condition to said ringing condition, said control means including means operable in said ringing condition to interrupt the operation of said means responsive to speech signals.

2. A ringing circuit to which both speech and ringing signals are applied comprising control means having a ringing and a non-ringing condition, means operable in the absence of both signals to maintain said control means in the non-ringing condition, frequency sensitive means responsive to speech signals to apply a first voltage to said control means to insure maintenance of said control means in said non-ringing condition during occurrence of speech signals, frequency sensitive means responsive to ringing signals to apply a second voltage to said control means to change said control means from said non-ringing condition to said ringing condition, and means operable while said control means is in said ringing condition to remove therefrom the application of said first voltage during the occurrence of ringing signals.

3. A ringing circuit according to claim 2, wherein the frequency sensitive means responsive to speech signals includes a low pass band filter of high impedance characteristics and the frequency sensitive means responsive to ringing signals includes a band pass filter of relatively low impedance, the frequency range of the latter being outside the frequency range of said low pass band filter.

4. A ringing circuit according to claim 3, wherein said low pass band filter circuit comprises a series coupled inductance, capacitance, and a relatively high resistance and said band pass filter circuit comprises a series coupled inductance, capacitance, and a relatively low resistance.

5. A ringing circuit according to claim 4, wherein each of the capacitances of said filter circuits has a diode coupled thereacross to insure a positive output voltage in response to speech signals and a negative output voltage in response to ringing signals.

6. A ringing circuit to which both speech and ringing signals are applied comprising control means having a ringing and a non-ringing condition, means operable in the absence of both signals to maintain said control means normally in the non-ringing condition, filter means responsive to speech signals to apply a voltage to said control means to insure maintenance of said control means in said non-ringing condition during occurence of speech signals, and filter means responsive to ringing signals to apply another voltage to said control means to change said control means from said non-ringing condition to said ringing condition, said filter means responsive to speech signals having a relatively high effective impedance and said filter means responsive to ringing signals having a relatively low effective impedance.

7. A ringing circuit to which both speech and ringing signals are applied comprising control means having a ringing and a non-ringing condition, means operable in the absence of both signals to maintain said control means normally in the non-ringing condition, filter means responsive to speech signals to apply a voltage to said control means to insure maintenance of said control means in said non-ringing condition during occurrence of speech signals, and filter means responsive to ringing signals to apply another voltage to said control means to change said control means from said non-ringing condition to said ringing condition, said filter means responsive to speech signals having a relatively high effective impedance and comprising a series coupled inductance, capacitance, and a relatively high resistance and said filter means responsive to ringing signals having a relatively low effective impedance and comprising a series coupled inductance, capacitance, and a relatively low resistance.

8. A ringing circuit according to claim 7, wherein each of the capacitance of each of said filter means has a diode coupled thereacross to insure a positive output voltage in response to speech signals and a negative output voltage in response to ringing signals.

9. A ringing circuit comprising a low pass band filter of relatively high effective impedance responsive to speech signals to produce a given voltage output, a band pass filter of relatively low effective impedance responsive to ringing signals to produce a voltage output distinct from said given voltage, means to apply speech and ringing signals to both filters, a ringing indicator, control means for said indicator to normally maintain said indicator in a non-ringing condition, means coupling the voltage output of said low pass band filter to said control means to maintain said indicator in said non-ringing condition and means coupling the voltage output of said band pass filter, said control means to effect operation of said ringing indicator.

10. A ringing circuit comprising a low pass band filter of relatively high effective impedance responsive to speech signals to produce a given voltage output, a band pass filter of relatively low effective impedance responsive to ringing signals to produce a voltage output distinct from said given voltage, means to apply speech and ringing signals to both filters, a ringing indicator, control means for said indicator to normally maintain said indicator in a non-ringing condition, means coupling the voltage output of said low pass band filter to said control means to maintain said indicator in said non-ringing condition, means coupling the voltage output of said band pass filter to said control means to effect operation of said ringing indicator, and responsive to the operation of said ringing indicator to remove from said control means voltages that would normally be produced in said filter circuits by an occurrence of speech signals.

References Cited in the file of this patent

UNITED STATES PATENTS

| | | |
|---|---|---|
| 2,282,271 | Terroni et al. | May 5, 1942 |
| 2,410,149 | Clark | Oct. 29, 1946 |
| 2,535,104 | Van Mierlo | Dec. 26, 1950 |
| 2,654,002 | Hooijkamp et al. | Sept. 29, 1953 |
| 2,658,112 | Davison et al. | Nov. 3, 1953 |
| 2,686,227 | Ryall | Aug. 10, 1954 |